United States Patent
Wu et al.

(10) Patent No.: US 10,902,800 B2
(45) Date of Patent: Jan. 26, 2021

(54) CONTROLLING PRIVACY ON DISPLAYS

(71) Applicant: HEWLETT-PACKARD DEVELOPMENT COMPANY, L.P., Spring, TX (US)

(72) Inventors: Kuan-Ting Wu, Taipei (TW); Wei-Chung Chen, Taipei (TW); Xuan-Fang Shi, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,937

(22) PCT Filed: Jun. 23, 2017

(86) PCT No.: PCT/US2017/038931
§ 371 (c)(1),
(2) Date: Oct. 17, 2019

(87) PCT Pub. No.: WO2018/236387
PCT Pub. Date: Dec. 27, 2018

(65) Prior Publication Data
US 2020/0143754 A1 May 7, 2020

(51) Int. Cl.
*G09G 3/34* (2006.01)
*G09G 3/32* (2016.01)
*G06F 21/84* (2013.01)
*G09G 3/20* (2006.01)

(52) U.S. Cl.
CPC ............. *G09G 3/346* (2013.01); *G06F 21/84* (2013.01); *G09G 3/2003* (2013.01); *G09G 3/32* (2013.01); *G09G 2320/028* (2013.01); *G09G 2320/0606* (2013.01); *G09G 2354/00* (2013.01); *G09G 2358/00* (2013.01)

(58) Field of Classification Search
CPC ........ G09G 3/346; G09G 3/2003; G09G 3/32; G09G 2320/028; G09G 2320/0606; G09G 2354/00; G09G 2358/00
See application file for complete search history.

(56) References Cited

U.S. PATENT DOCUMENTS 9,554,124 B1 * 1/2017 Owurowa ............... G02B 30/27
10,685,492 B2 * 6/2020 Choi .................. G02B 27/0172
(Continued)

FOREIGN PATENT DOCUMENTS

| CN | 105549238 A | 5/2016 |
|---|---|---|
| CN | 205581874 U | 9/2016 |
| WO | WO-2016062634 A2 | 4/2016 |

OTHER PUBLICATIONS

Shiota, K. et al., Viewing-angle-switching Device Based on Array of Optical Micro-rods Incorporated with Electrophoretic Material Systems, Mar. 23, 2017, <http://onlinelibrary.wiley.com/doi/10.1002/isid.528/full#references>.

*Primary Examiner* — Ricardo Osorio
(74) *Attorney, Agent, or Firm* — HPI Patent Department

(57) ABSTRACT

Controlling privacy on a display includes a light-emitting diode (LED) pixel rotatably coupled to a microelectromechanical system (MEMS) and a controller to control the MEMS, the MEMS to rotate the LED pixel in response to a command issued by the controller to modify a viewing angle of the LED pixel such that the privacy on the display for that LED pixel is maintained.

17 Claims, 13 Drawing Sheets

(56) References Cited

U.S. PATENT DOCUMENTS

| | | | |
|---|---|---|---|
| 2008/0211840 A1* | 9/2008 | Zevin | B41J 2/355 |
| | | | 347/9 |
| 2008/0278445 A1* | 11/2008 | Sweetser | G06F 3/0325 |
| | | | 345/158 |
| 2009/0303746 A1* | 12/2009 | Wang | G02B 6/0038 |
| | | | 362/625 |
| 2010/0124363 A1 | 5/2010 | Ek et al. | |
| 2011/0018860 A1 | 1/2011 | Parry-Jones et al. | |
| 2012/0050342 A1 | 3/2012 | Huang et al. | |
| 2013/0300637 A1 | 11/2013 | Smits et al. | |
| 2013/0328754 A1* | 12/2013 | Lai | G09G 3/346 |
| | | | 345/82 |
| 2014/0009377 A1 | 1/2014 | Shibazaki et al. | |
| 2014/0211295 A1 | 7/2014 | Maxik et al. | |
| 2016/0357992 A1 | 12/2016 | Cohen et al. | |
| 2017/0116425 A1 | 4/2017 | Chang | |
| 2017/0255020 A1* | 9/2017 | Tam | G06F 3/013 |
| 2017/0351900 A1* | 12/2017 | Lee | G06K 9/00228 |
| 2018/0231832 A1* | 8/2018 | Liu | G02B 27/0172 |
| 2019/0165859 A1* | 5/2019 | Little | H04B 10/116 |
| 2019/0227332 A1* | 7/2019 | Qin | H04N 13/365 |
| 2019/0331921 A1* | 10/2019 | Suzuki | G02B 27/4272 |

\* cited by examiner

526

| LED Pixel 502-1 | LED Pixel 502-2 | LED Pixel 502-3 | LED Pixel 502-4 | LED Pixel 502-5 | LED Pixel 502-6 | LED Pixel 502-7 |
|---|---|---|---|---|---|---|
| LED Pixel 502-8 | LED Pixel 502-9 | LED Pixel 502-10 | LED Pixel 502-11 | LED Pixel 502-12 | LED Pixel 502-13 | LED Pixel 502-14 |
| LED Pixel 502-15 | LED Pixel 502-16 | LED Pixel 502-17 | LED Pixel 502-18 | LED Pixel 502-19 | LED Pixel 502-20 | LED Pixel 502-21 |
| LED Pixel 502-22 | LED Pixel 502-23 | LED Pixel 502-24 | LED Pixel 502-25 | LED Pixel 502-26 | LED Pixel 502-27 | LED Pixel 502-28 |
| LED Pixel 502-29 | LED Pixel 502-30 | LED Pixel 502-31 | LED Pixel 502-32 | LED Pixel 502-33 | LED Pixel 502-34 | LED Pixel 502-35 |
| LED Pixel 502-36 | LED Pixel 502-37 | LED Pixel 502-38 | LED Pixel 502-39 | LED Pixel 502-40 | LED Pixel 502-41 | LED Pixel 502-42 |

*Fig. 5*

CONTROLLING PRIVACY ON DISPLAYS

BACKGROUND

A display is an output device for presenting information in visual form. The display includes components such as a number of light-emitting diode (LED) pixels to present the information in visual form. The LED pixels include a red LED, a green LED and a blue LED. The LED pixels are controlled by circuitry to emit light such that the information is present in visual form on the display.

BRIEF DESCRIPTION OF THE DRAWINGS

The accompanying drawings illustrate various examples of the principles described herein and are a part of the specification. The examples do not limit the scope of the claims.

FIG. 5 is an example of a display for controlling privacy, according to one example of principles described herein.

Throughout the drawings, identical reference numbers designate similar, but not necessarily identical, elements.

DETAILED DESCRIPTION

Figure 1A:
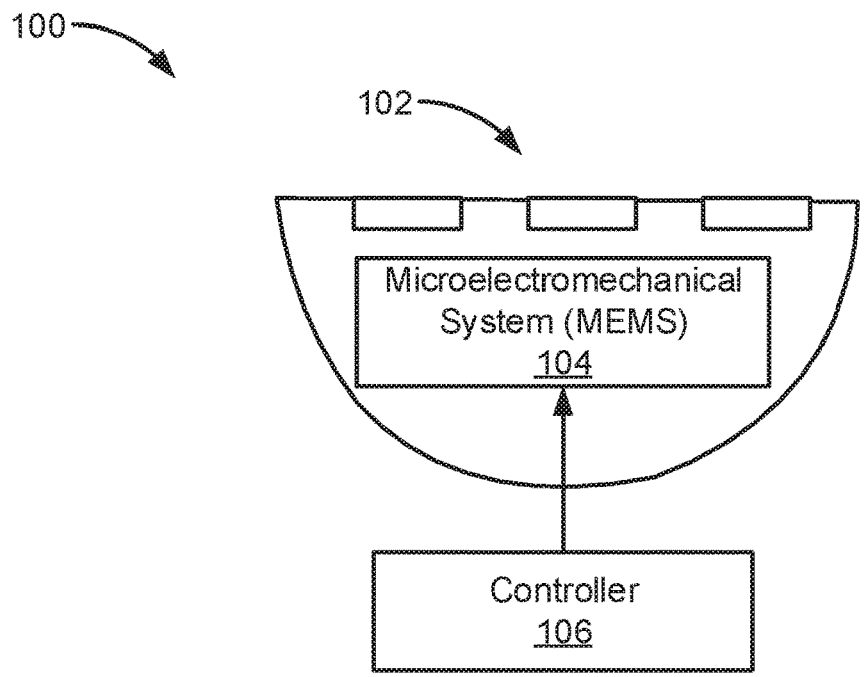
FIG. 1A is a diagram of a system for controlling privacy on a display, according to one example of principles described herein.

As mentioned above, a display is an output device for presenting information in visual form. The display allows the information to be viewed from a variety of viewing angles. Viewing angles for displays can be between −45 degrees and +45 degrees relative to a center viewing angle of the display. This allows multiple people to view the information displayed on the display at the same time.

Often, the information displayed on the display is sensitive information. Sensitive information includes insurance policies, banking accounts, finance records, human resources, trade secrets, examinations, medical records, security applications and other sensitive information. Due to this sensitive information, it is desirable to keep this sensitive information private when viewed on the display such that only authorized persons can view the sensitive information. However, with current displays, this sensitive information can be viewed, via the display, from a variety of angles as described above. As a result, persons who are not authorized to view the sensitive information can view the sensitive information if they are within a viewing angle of the display.

To control privacy on the display, a privacy screen is placed over the display. The privacy screen is designed to allow the information displayed on the display to be viewed at specific angles. For example between −15 to +15 degrees from the center viewing angle of the display. While the privacy screen does limit the viewing angle of the display, thus controlling privacy on the display, the privacy screen darkens the display. As a result, the brightness of the light-emitting diode (LED) pixels for the display is increased. However, this leads to more power consumption on the display and can lead to the display overheating. Further, if the user moves position relative to the display with the privacy screen such that the user is no longer within the viewing angle, the user is not able to view the information on the display. As a result, the user has to reposition themselves within the viewing angle to view the information. This can be a burdensome task as the user often moves positions throughout the day.

Consequently, the principles described herein include, for example, a system for controlling privacy on a display. The system includes a LED pixel rotatably coupled to a microelectromechanical system (MEMS) and a controller to control the MEMS, the MEMS to rotate the LED pixel in response to a command issued by the controller to modify a viewing angle of the LED pixel such that the privacy on the display for that LED pixel is maintained.

In another example, the principles described herein include a display device. The device includes a number of LED pixels, a number of MEMS, each of the LED pixels rotatably coupled to one of the MEMS and a controller to individually control each of the MEMS, the MEMS to selectively rotate the LED pixels in response to a command issued by the controller to modify a viewing angle of those LED pixels such that private viewing of the display device is maintained.

In another example, the principles described herein include a method for controlling privacy on a display. The method includes receiving, via an input source of a controller, an input that is to modify a viewing angle of LED pixels of the display, with a processor and memory of the controller, issuing a command to a MEMS to rotate the LED pixels and based on the command, rotating the LED pixels via the MEMS such that the private viewing of the display is maintained.

In the present specification and in the appended claims, the term "MEMS" means a device that rotates a LED pixel. The MEMS include a motor gear connected to a motor such that as the motor rotates in response to a command issued by the controller, teeth of the motor gear enmesh with teeth of a housing gear located on an inner wall of a housing of an LED pixel to rotate the LED pixel.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1A is a diagram of a system for controlling privacy on a display, according to one example of principles described herein. As will be described below, the system (100) includes a LED pixel (102), a MEMS (104) and a controller (106).

As illustrated, the system (100) includes a LED pixel (102) rotatably coupled to a MEMS (104) and a controller (106) to control the MEMS (104). The MEMS (104) to rotate the LED pixel (102) in response to a command issued by the controller (106) to modify a viewing angle of the LED pixel (102) such that the privacy on the display for that LED pixel (102) is maintained.

Figure 1B:
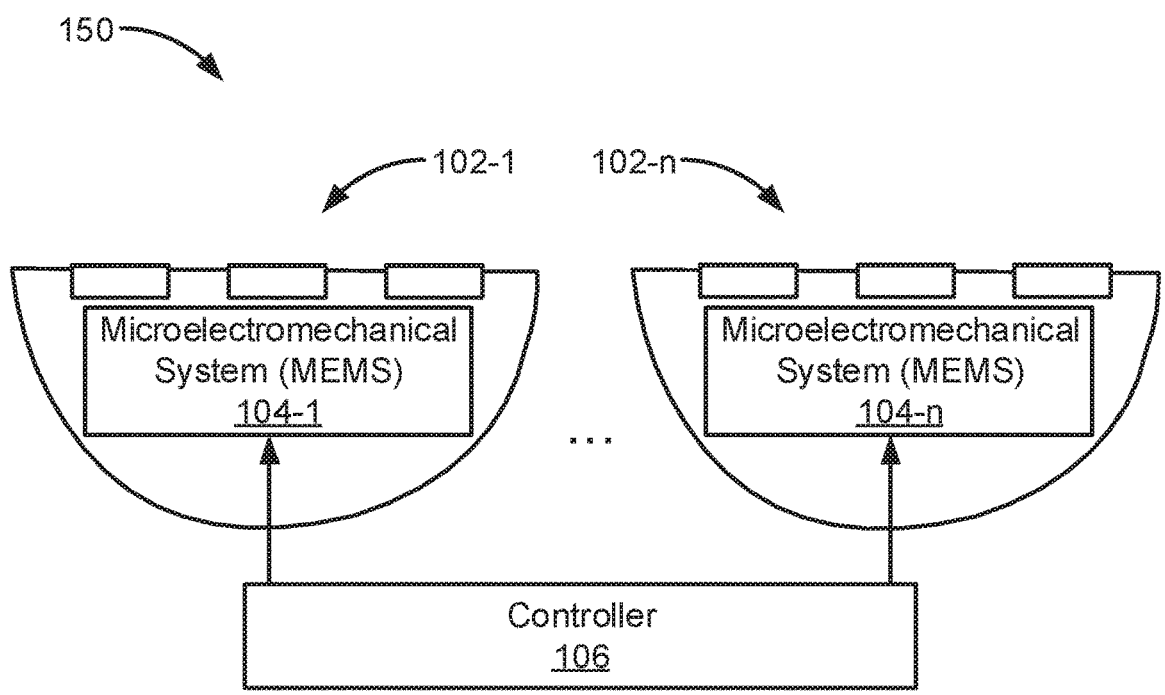
FIG. 1B is a diagram of a display device for controlling privacy on a display, according to one example of principles described herein.

FIG. 1B is a diagram of a display device for controlling privacy on a display, according to one example of principles described herein. As will be described below, a display device (150) includes a number of LED pixels (102), a number of MEMS (104) and a controller (106).

As illustrated, the display device (150) includes a number of LED pixels (102-1 to 102-n), a number of MEMS (104-1 to 104-n), each of the LED pixels (102-1 to 102-n) rotatably coupled to one of the MEMS (104-1 to 104-n) and a controller (106) to individually control each of the MEMS (104-1 to 104-n). The MEMS (104-1 to 104-n) to selectively rotate the LED pixels (102-1 to 102-n) in response to a command issued by the controller (106) to modify a viewing angle of those LED pixels (102-1 to 102-n) such that private viewing of the display device (150) is maintained.

Figure 2A:
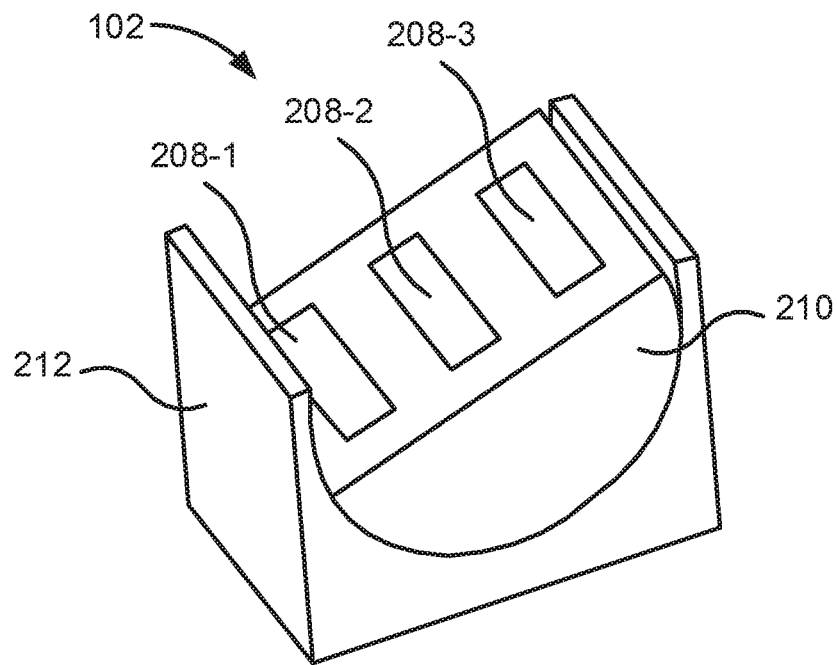
FIG. 2A is a diagram of an example of a light-emitting diode (LED) pixel rotated to the left, according to one example of principles described herein.

FIG. 2A is a diagram of an example of a LED pixel rotated to the left, according to one example of principles described herein. As will be described in FIGS. 2A and 2B, the MEMS (104) is used to rotate the LED pixel (102) to the left based on a command issued by the controller (106).

Turning specifically to FIG. 2A, the LED pixel (102) includes a housing (210). The housing (210) is used to encase a number of component of the LED pixel (102) and the MEMS (104). For example, the housing (210) is used to house a blue LED (208-1), a green LED (208-2) and red LED (208-3). The LEDs (208) are mounted on a flat portion of the housing (210) as illustrated in FIG. 2A, In some examples, the LEDs (208) are micro-LEDs (µ-LED), The housing (210) is made out of a material such as plastic or other suitable materials. As will be described in FIG. 2B, the housing (210) includes a housing gear (220). The housing gear (220) is located on an inner wall of the housing (210). More information about the housing gear (220) will be described below.

The housing (210) is rotatably connected to a case (212). As will be described below, as the housing (210) of the LED pixel (102) rotates, the case (212) provides a base such that the housing (210) of the LED pixel (102) rotates about an axis. In some examples, the LED pixel (102) is rotated between −70 degrees and +70 degrees via the MEMS (104) in response to the command issued by the controller (106). As illustrated in FIG. 2A, the LED pixel (102) is rotated to the left. For example between −1 and −70 degrees. As a result, if a user is positioned left of the display (526), the user can view the information displayed on the display (526) because the user is within a viewing angle of the LED pixel (102). However, if the user is positioned right of the display (526), the user cannot view the information displayed on the display (526) due to the LED pixel (102) rotating to the left such that the user is outside of a viewing angle of the LED pixel (102). Thus, private viewing of the display (526) is maintained for users positioned left of the LED pixel (102).

Figure 2B:
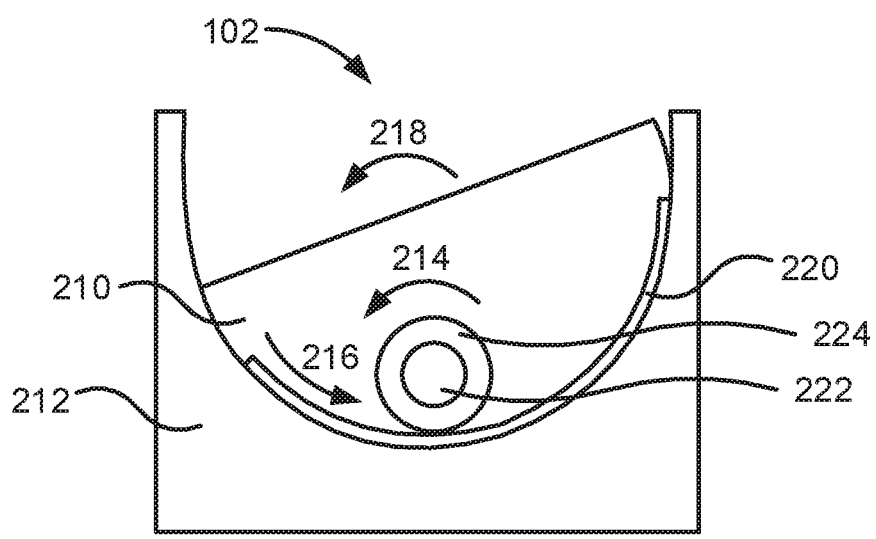
FIG. 2B is a diagram of an example of a LED pixel rotated to the left, according to one example of principles described herein.

FIG. 2B is a diagram of an example of a LED pixel rotated to the left, according to one example of principles described herein. As will be described below, the MEMS (104) is used to rotate the LED pixel (102) to the left based on a command received from the controller (106).

In an example, the MEMS (104) receive a command from the controller (106) to rotate the LED pixel (102) to the left to maintain privacy control. As illustrated, the MEMS (104) includes a motor gear (224) connected to a motor (222) such that as the motor (222) rotates as indicated by arrow 214 in response to the command issued by the controller (106) to rotate the LED pixel (102) to the left, teeth of the motor gear (224) enmesh with teeth of the housing gear (220). This causes the housing gear (220) to rotate as indicated by arrow 216. Since the housing gear (220) is connected to the inner wall of the housing (210) of the LED pixel (102) as described above, the LED pixel (102) rotates as indicate by arrow 218. As a result, a viewing angle of the LED pixel (102) is modified such that the privacy on the display (526) for that LED pixel is maintained. Thus, private viewing of the display (526) is maintained for users positioned left of the display (526) for that LED pixel (102).

While the examples of FIGS. 2A and 2B describe the MEMS (104) rotating a single LED pixel (102), other figures and examples describe the MEMS (104) selectively rotating a number of LED pixels (102). As a result, more than one LED pixel (102) can be rotated such that the privacy on the display (526) is maintained.

Figure 3A:
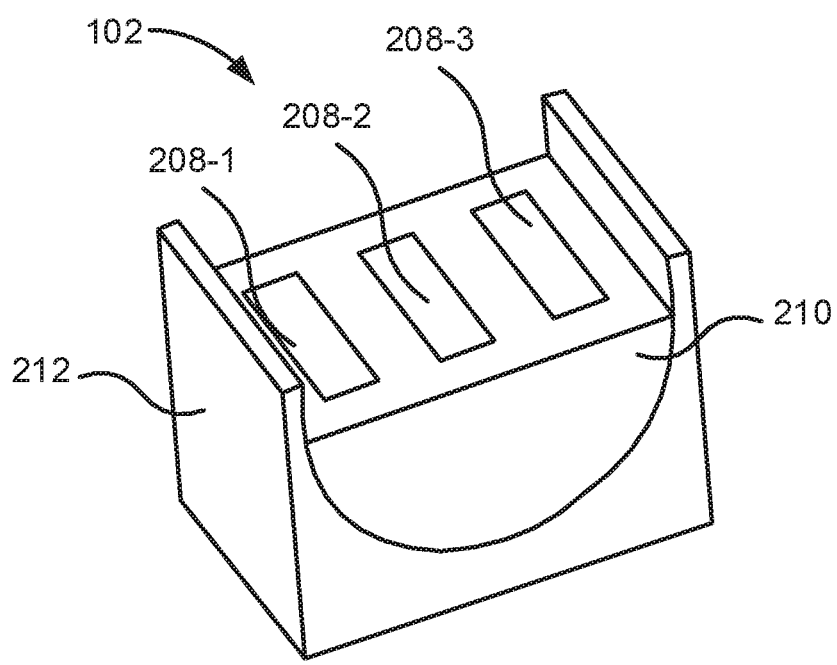
FIG. 3A is a diagram of an example of LED pixel rotated to center, according to one example of principles described herein.

FIG. 3A is a diagram of an example of LED pixel rotated to center, according to one example of principles described herein. As will be described in FIGS. 3A and 3B, the MEMS (104) is used to rotate the LED pixel (102) to center (i.e. 0 degrees) based on a command issued by the controller (106).

As illustrated in FIG. 3A, the LED pixel (102) is rotated to a center position. For example, to 0 degrees. As a result, if a user is positioned left, center, or right of the display (526), the user can view the information displayed on the display (526).

Figure 3B:
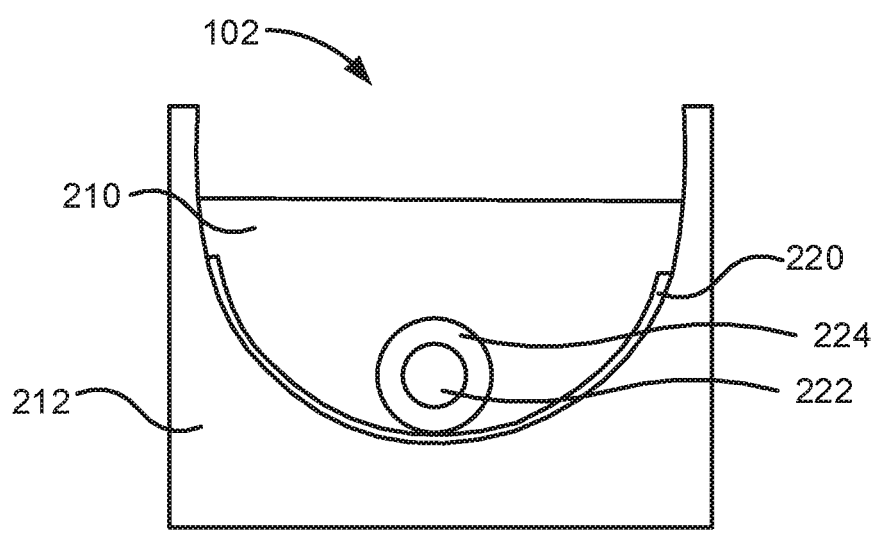
FIG. 3B is a diagram of an example of LED pixel rotated to center, according to one example of principles described herein.

FIG. 3B is a diagram of an example of LED pixel rotated to center, according to one example of principles described herein. As will be described below, the MEMS (104) is used to rotate the LED pixel (102) to the center position based on a command received from the controller (106).

In an example, the MEMS (104) receive a command from the controller (106) to rotate the LED pixel (102) to the center. As illustrated, the MEMS (104) includes a motor gear (224) connected to a motor (222) such that as the motor (222) rotates as in response to the command issued by the controller (106) to rotate the LED pixel (102) to the center, teeth of the motor gear (224) enmesh with teeth of the housing gear (220). This causes the housing gear (220) to rotate, either left or right depending on the current position of the LED pixel (102), until the LED pixel (102) reaches center. Since the housing gear (220) is connected to the inner wall of the housing (210) of the LED pixel (102) as described above, the LED pixel (102) rotates to center as illustrated in FIG. 3B. As a result, a viewing angle of the LED pixel (102) is modified such that the information displayed on the display (526) can be viewed from a variety of viewing angles.

While the examples of FIGS. 3A and 3B describe the MEMS (104) rotating a single LED pixel (102), other figures and examples describe the MEMS (104) selectively rotating a number of LED pixels (102). As a result, more than one LED pixel (102) can be rotated to center.

Figure 4A:
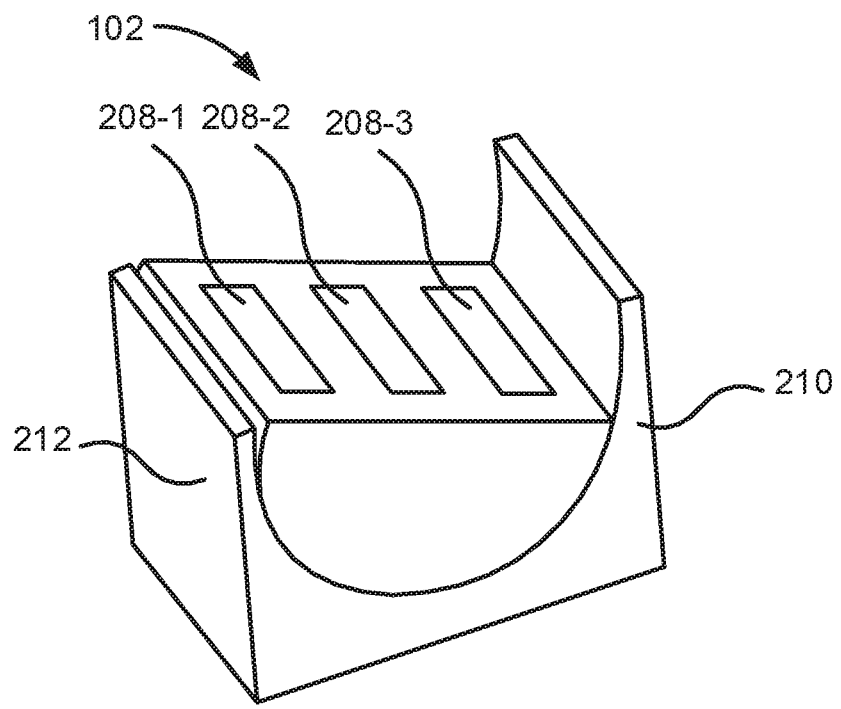
FIG. 4A is a diagram of an example of a LED pixel rotated to the right, according to one example of principles described herein.

FIG. 4A is a diagram of an example of a LED pixel rotated to the right, according to one example of principles described herein. As will be described in FIGS. 4A and 4B, the MEMS (104) is used to rotate the LED pixel (102) based on a command issued by the controller (106) to the right.

As illustrated in FIG. 4A, the LED pixel (102) is rotated to the right. For example between +1 and +70 degrees. As a result, if a user is positioned to the right of the display (526), the user can view the information displayed on the display (526). However, if the user is positioned left of the display (526), the user cannot view the information displayed on the display (526) due to the LED pixel (102) rotating to the right. Thus, private viewing of the display (526) is maintained for users positioned right of the display (526).

Figure 4B:
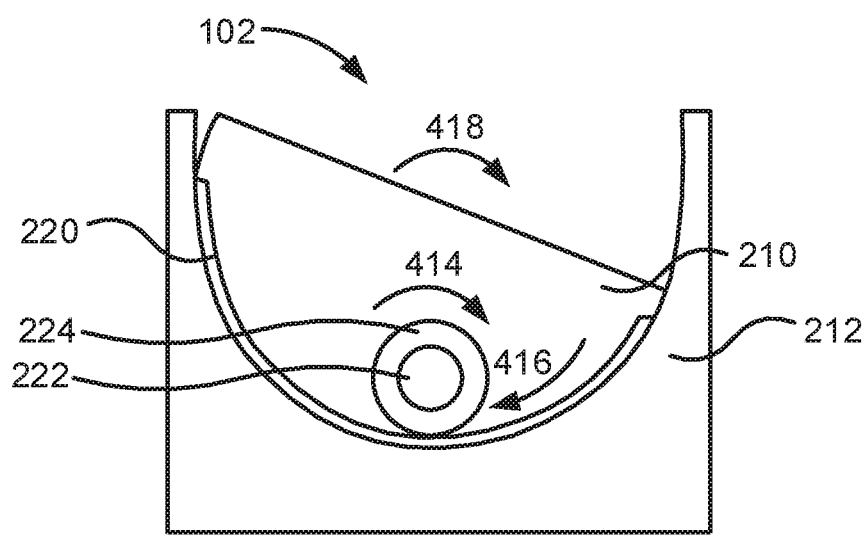
FIG. 4B is a diagram of an example of a LED pixel rotated to the right, according to one example of principles described herein.

FIG. 4B is a diagram of an example of a LED pixel rotated to the right, according to one example of principles described herein. As will be described below, the MEMS (104) is used to rotate the LED pixel (102) to the right based on a command received from the controller (106).

In an example, the MEMS (104) receive a command from the controller (106) to rotate the LED pixel (102) to the right to maintain privacy. As illustrated, the MEMS (104) includes a motor gear (224) connected to a motor (222) such that as the motor (222) rotates as indicated by arrow 414 in response to the command issued by the controller (106) to rotate the LED pixel (102) to the right, teeth of the motor gear (224) enmesh with teeth of the housing gear (220). This causes the housing gear (220) to rotate as indicated by arrow 416. Since the housing gear (220) is connected to the inner wall of the housing (210) of the LED pixel (102) as described above, the LED pixel (102) rotates as indicate by arrow 418. As a result, a viewing angle of the LED pixel (102) is modified such that the privacy on the display (526) for that LED pixel is maintained. Thus, private viewing of the display (526) is maintained for users positioned to the right of the display (526) for that LED pixel (102).

While the examples of FIGS. 4A and 4B describe the MEMS (104) rotating a single LED pixel (102), other figures and examples describe the MEMS (104) selectively rotating a number of LED pixels (102). As a result, more than one LED pixel (102) can be rotated such that the privacy on the display (526) is maintained.

FIG. 5 is an example of a display for controlling privacy, according to one example of principles described herein. As will be described below, the display (526) includes a number of LED pixels (502).

As illustrated, the display (526) includes a number of LED pixels (502). As will be described below, the MEMS (104) rotate the LED pixels (502) to an angle in response to the command issued by the controller (106). In an example, the angle is between −70 to +70 degrees.

In one example, the MEMS (104) rotates each of the LED pixels (502) to an angle in response to the command issued by the controller (104) such that the private viewing of the display (526) for all the LED pixels (502) of the display (526) is maintained. For example, each of the LED pixels (502) includes a MEMS (104) that can rotate that LED pixel (502). In this example, all of the MEMS (104) for all of the LED pixels (502) are instructed to rotate each LED pixel (502) to the same angle. For example to +30 degrees. Thus, private viewing of the display (526) is maintained for users positioned to the right of the display (526) for the LED pixels (502).

In another example, LED pixels associated with horizontal lines of the display (526) are rotated independent from the LED pixels associated with vertical lines of the display (526) such that the private viewing of the horizontal lines on the display (526) is maintained. In this example, LED pixels 502-1 to 502-7, 502-15 to 502-21, 502-29 to 502-35 are associated with the horizontal lines of the display and the rest of the LED pixels illustrated in FIG. 5 are associated with the vertical lines. In one example, the controller (106) issues a command to the MEMS for LED pixels 502-1 to 502-7, 502-15 to 502-21, 502-29 to 502-35 to rotate to +70 degrees. Once rotated, private viewing of the display (526) is maintained for users positioned to the right of the display (526) for the LED pixels 502-1 to 502-7, 502-15 to 502-21 502-29 to 502-35 while the rest of the LED pixels remain at their previous viewing angle if the previous viewing angle for those LED pixels is 0 degrees or less. If the viewing angle for those LED pixels is more than 0 degrees, those LED pixels are rotated to 0 degrees or less.

In yet another example, the LED pixels associated with vertical lines of the display (526) are rotated independent from the LED pixels associated with horizontal lines of the display (526) such that the private viewing of the vertical lines on the display (526) is maintained. In this example, LED pixels 502-1 to 502-7, 502-15 to 502-21, 502-29 to 502-35 are associated with the horizontal lines of the display (526) and the rest of the LED pixels are associated with the vertical lines. In one example, the controller (106) issues a command to the MEMS for the rest of the LED pixels to rotate to −70 degrees. Once rotated, private viewing of the display (526) is maintained for users positioned to the left of the display (526) for those LED pixels while the LED pixels 502-1 to 502-7, 502-15 to 502-21, 502-29 to 502-35 remain at their previous viewing angle if the previous viewing angle for those LED pixels is 0 degrees or more. If the viewing angle for LED pixels 502-1 to 502-7, 502-15 to 502-21, 502-29 to 502-35 is less than 0 degrees, those LED pixels 502-1 to 502-7, 502-15 to 502-21, 502-29 to 502-35 are rotated to 0 degrees or more.

In yet another example, the MEMS (104) rotates a portion of the LED pixels in response to the command issued by the controller (106) such that the private viewing of that portion of the LED pixels of the display (526) is maintained. For example, LED pixels 502-1 to 502-17 are rotated to +70 degrees via the MEMS (104) in response to the command issued by the controller (106). Once rotated, private viewing of the display (526) is maintained for users positioned to the left of the display (526) for LED pixels 502-1 to 502-17 while the other LED pixels remain at their previous viewing angle if the previous viewing angle for those LED pixels is 0 degrees or less. As a result, the private viewing of that LED pixels 502-1 to 502-17 of the display (526) is maintained.

Figure 6:
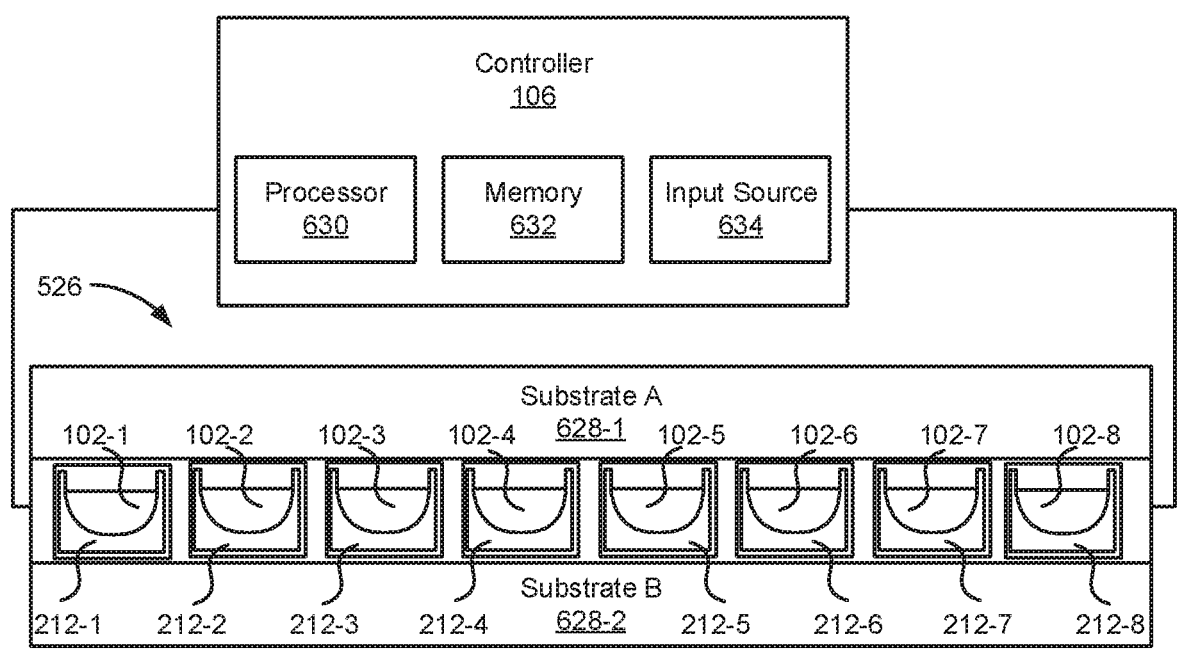
FIG. 6 is an example of a top view of a display for controlling privacy, according to one example of principles described herein.

FIG. 6 is an example of a top view of a display for controlling privacy, according to one example of principles described herein. As mentioned above, a controller (106) is used to issue a command to the MEMS (104) to instruct the MEMS (104) to rotate the LED pixels (102) such that the private viewing of the LED pixels (102) of the display device (526) is maintained. FIGS. 6 to 12 describe a display (526) that includes the LED pixels (102) located between substrates (628), an optical film (730), a reflector (832), a touch sensor (1034), or combinations thereof.

Turning specifically to FIG. 6, the controller (106) includes a processor (630) and memory (632) to receive an input from an input source (634) of the controller (106) and based on that input issue the command to the MEMS (104) to rotate the LED pixels (102).

In one example, the input source (634) of the controller (106) is a number of push buttons. The push buttons include a left push button, a center push button and a right push button. When the user presses the left push button, the controller (106) issues a command to the MEMS (104) to rotate the LED pixels (102) to the left. In one example, depending on how long the user presses the left push button determines how many degrees to the left the LED pixels (102) rotate. For example, for every second the user presses the left push button, the LED pixels (102) rotate to the left −10 degrees, up to −70 degrees. In another example, once the left push button is pressed by the user, the LED pixels (102) rotate to the maximum angle to the left. For example, −70 degrees.

When the user presses the right push button, the controller (106) issues a command to the MEMS (104) to rotate the LED pixels (102) to the right. In one example, depending on how long the user presses the right push button determines how many degrees to the right the LED pixels (102) rotate. For example, for every second the user presses the right push button, the LED pixels (102) rotate to the right +10 degrees, up to +70 degrees. In another example, once the right push button is pressed by the user, the LED pixels (102) rotate to the maximum angle to the right. For example, +70 degrees.

When the user presses the center push button, the controller (106) issues a command to the MEMS (104) to rotate the LED pixels (102) to the center. As a result, the LED pixels (102) are rotated to 0 degrees.

In another example, the controller (106) includes a processor (603) and memory (632) to receive an input from an input source (634) such as a rotatable knob of the controller (106) and based on that input issue the command to the MEMS (104) to rotate the LED pixels (102).

When the user rotates the rotatable knob to the left, the controller (106) issues a command to the MEMS (104) to rotate the LED pixels (102) to the left. In one example, depending on the angle of the rotatable knob relative to a center position of the rotatable knob determines how many degrees to the left the LED pixels (102) rotate. For example, if the user rotates the rotatable knob to −30 degrees, the LED pixels rotate left to −30 degrees. In another example, once the rotatable knob is rotated to the left by the user, the LED pixels rotate to the maximum angle to the left. For example, −70 degrees.

When the user rotates the rotatable knob to the right, the controller (106) issues a command to the MEMS (104) to rotate the LED pixels (102) to the right. In one example, depending on the angle of the rotatable knob relative to a center position of the rotatable knob determines how many degrees to the right the LED pixels (102) rotate. For example, if the user rotates the rotatable knob to +30 degrees, the LED pixels (102) rotate right to +30 degrees. In another example, once the rotatable knob is rotated to the right by the user, the LED pixels (102) rotate to the maximum angle to the right. For example, +70 degrees.

When the user rotates the rotatable knob to the center, the controller (106) issues a command to the MEMS (104) to rotate the LED pixels (102) to a center position. As a result, the LED pixels (102) are rotated to 0 degrees.

In another example, the input source (634) of the controller (106) is a sensor. The sensor, such as a camera, detects a position of a user relative to the display (526) such that the controller (106) issues the command to the MEMS (104) to rotate the LED pixels (104) towards the user. For example, if the sensor detects the user's position is −30 degrees relative to the display, the controller (106) issues the command to the MEMS (104) to rotate the LED pixels (104) to −30 degrees such that the LED pixels (104) are rotated towards the user.

In other examples, if more than one user is detected by the sensor. The sensor detects which of the users is authorized to view the information displayed on the display (526) and rotates the LED pixels (102) accordingly.

In some examples, the controller (106) includes other input sources to allow the user to select which of the LED pixels (102) are to rotate. For example, a first button, when selected by the user, indicates all LED pixels (102) are to rotate. A second button, when selected by the user, indicates LED pixels (102) associated with horizontal lines of the display (526) are to rotate. A third button, when selected by the user, indicates LED pixels (102) associated with vertical lines of the display (526) are to rotate. A fourth button, when selected by the user, indicates a portion of the LED pixels (102) of the display (526) are to rotate.

As illustrated, the display (526) includes substrate A (628-1) and substrate B (628-2). The LED pixels (102) and the case (212) are located between the substrates (628) as illustrated in FIG. 6. In an example, the substrates (628) are glass or plastic substrates. The substrates (628) are transparent and thus allow light emitted from the LED pixels (102) to pass through the substrates (628).

Figure 7:
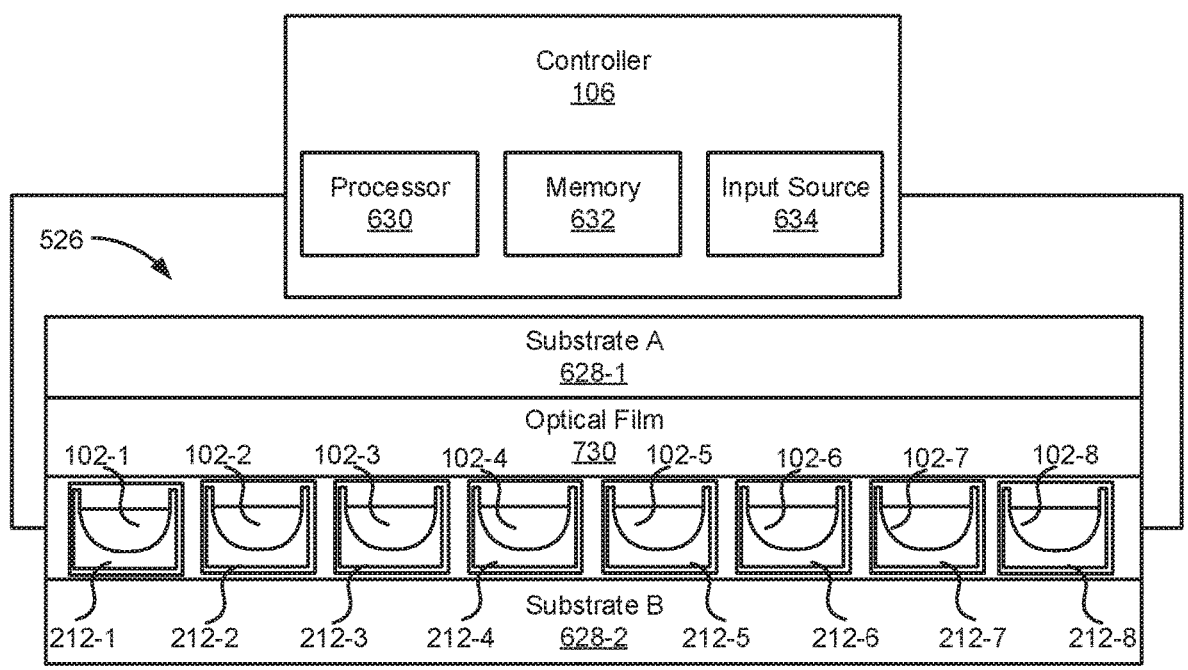
FIG. 7 is an example of a top view of a display for controlling privacy, according to one example of principles described herein.

FIG. 7 is an example of a top view of a display for controlling privacy, according to one example of principles described herein. As will be described below, the display (526) includes substrates (628) and an optical film (730).

As illustrated, the display (526) includes substrate A (628-1) and substrate B (628-2). The display (526) includes an optical film (730). The optical film (730) is located between substrate A (628-1) and the LED pixels (102). In an example, the optical film (730) is used to increase the brightness of the LED pixels (102). Further, the optical film (730) is used to diffuse the light emitted from the LED pixels (102) such that information displayed on the display device (526) appears more homogeneous. The optical film (730) includes asymmetric turning film, asymmetrical prism film, prism film, brightness enhancement film (BEF), dual brightness enhancement film (DBEF), diffuser or combinations thereof. The optical film (730) materials include polyacrylic, such as poly methyl methacrylate (PMMA) or polycarbonate and cyclic olefin copolymer (COC).

Figure 8:
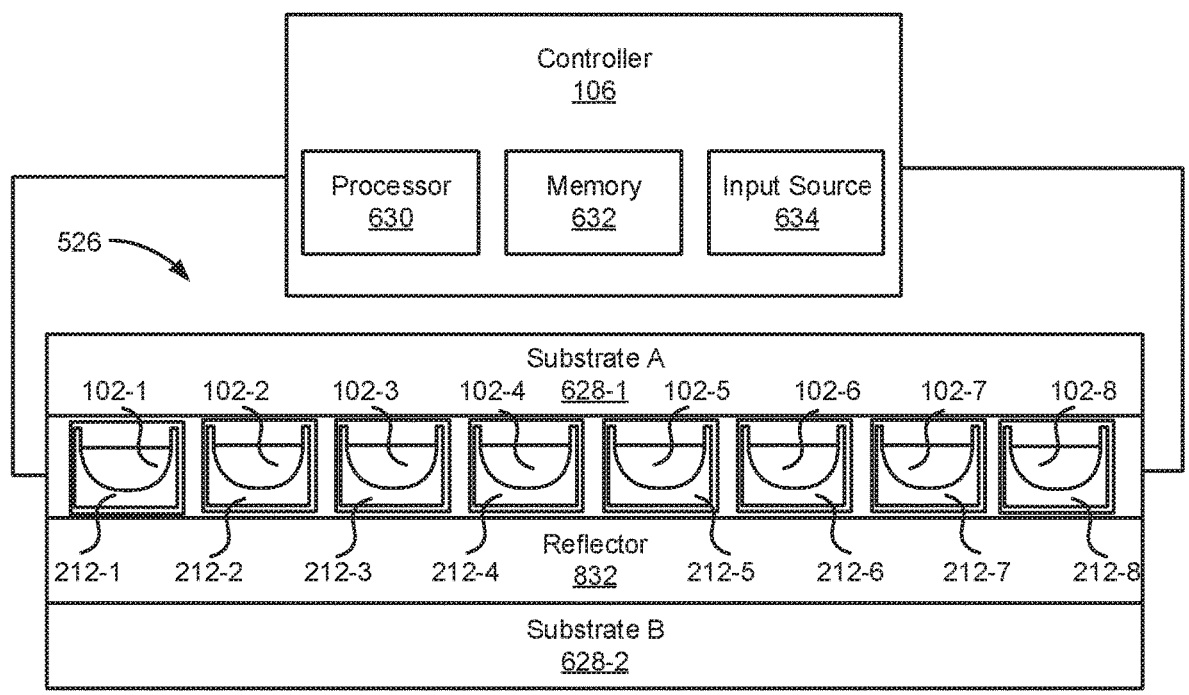
FIG. 8 is an example of a top view of a display for controlling privacy, according to one example of principles described herein.

FIG. 8 is an example of a top view of a display for controlling privacy, according to one example of principles described herein. As will be described below, the display (526) includes substrates (628) and a reflector (832).

As illustrated, the display (526) includes substrate A (628-1) and substrate B (628-2). The display (526) includes a reflector (832). The reflector (832) is located between the case (212) and substrate B (628-2) as illustrated in FIG. 8. The reflector (832) is a metallic film that is used to increase the brightness of the LED pixels (102).

Figure 9:
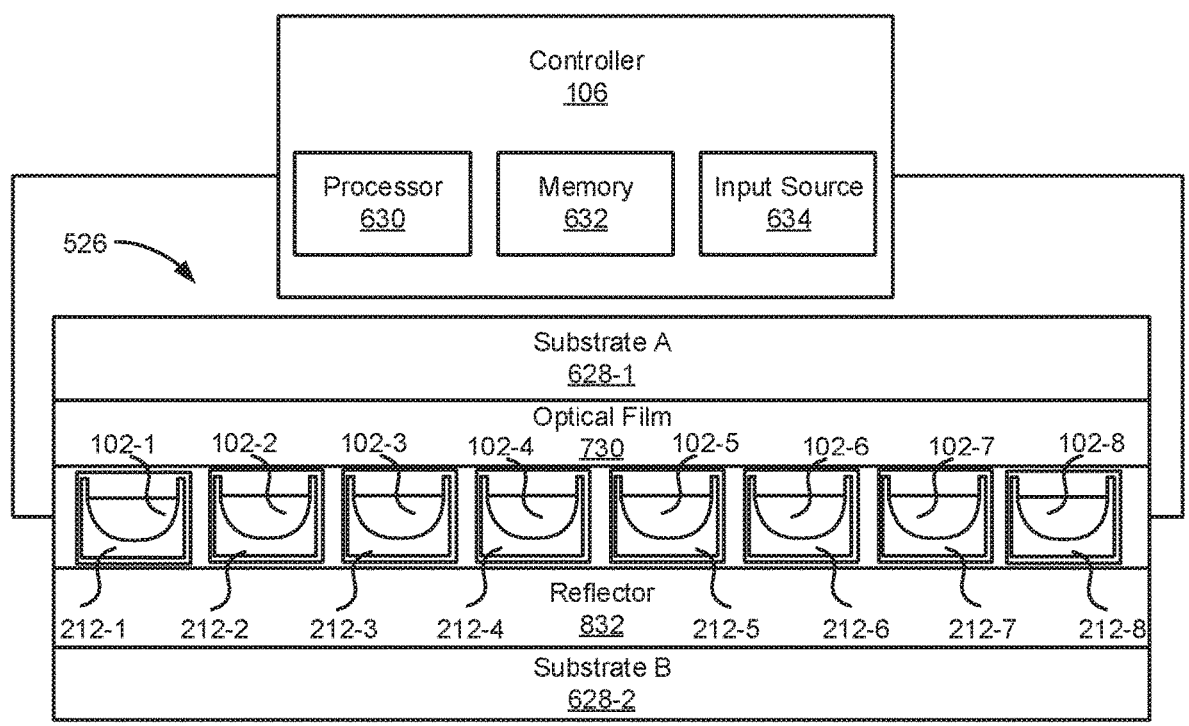
FIG. 9 is an example of a top view of a display for controlling privacy, according to one example of principles described herein.

FIG. 9 is an example of a top view of a display for controlling privacy, according to one example of principles described herein. As will be described below, the display (526) includes substrates (628), an optical film (730) and a reflector (832).

As illustrated, the display (526) includes substrate A (628-1) and substrate B (628-2). The display (526) includes a reflector (832). The reflector (832) is located between the case (212) and substrate B (628-2) as illustrated in FIG. 9. The optical film (730) is located between substrate A (628-1) and the LED pixels (102).

Figure 10:
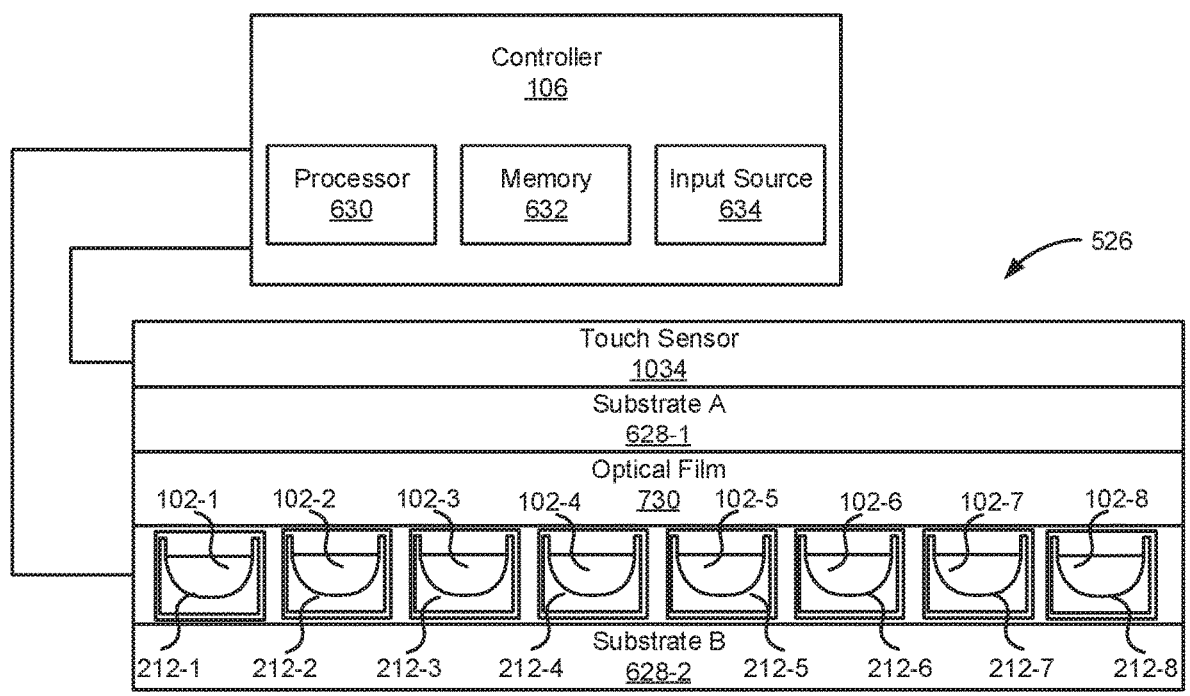
FIG. 10 is an example of a top view of a display for controlling privacy, according to one example of principles described herein.

FIG. 10 is an example of a top view of a display for controlling privacy, according to one example of principles described herein. As will be described below, the display (526) includes substrates (628), an optical film (730) and a touch sensor (1034).

As illustrated, the display (526) includes substrate A (628-1) and substrate B (628-2). The display (526) includes the optical film (730). The optical film (730) is located between substrate A (628-1) and the LED pixels (102). The display (526) includes the touch sensor (1034). The touch sensor (1034) is an input sensor that is layered on top of substrate A (628-1). The touch sensor (1034) allows the user to touch information displayed on the display (526) such that the user interacts directly with the display (526).

Figure 11:
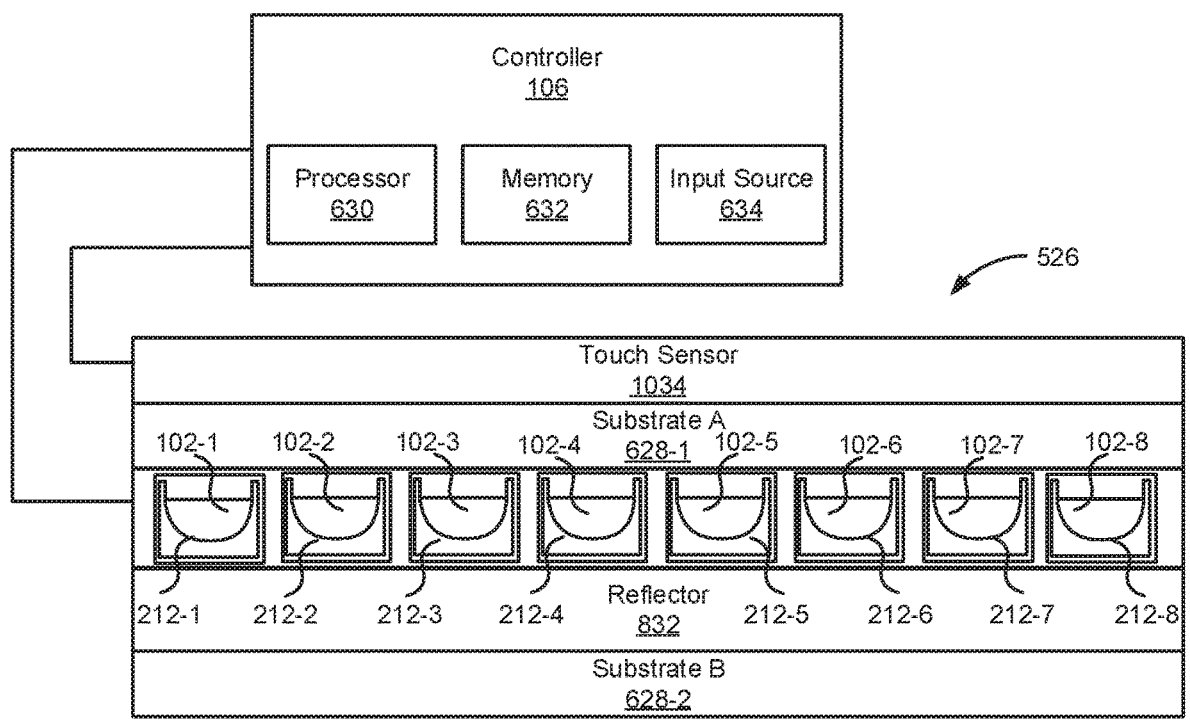
FIG. 11 is an example of a top view of a display for controlling privacy, according to one example of principles described herein.

FIG. 11 is an example of a top view of a display for controlling privacy, according to one example of principles described herein. As will be described below, the display (526) includes substrates (628), a reflector (832) and a touch sensor (1034).

As illustrated, the display (526) includes substrate A (628-1) and substrate B (628-2). The display (526) includes the reflector (832). The reflector (832) is located between substrate B (628-2) and the case (212). The display (526) includes the touch sensor (1034) located on top of substrate A (628-1) as illustrated.

Figure 12:
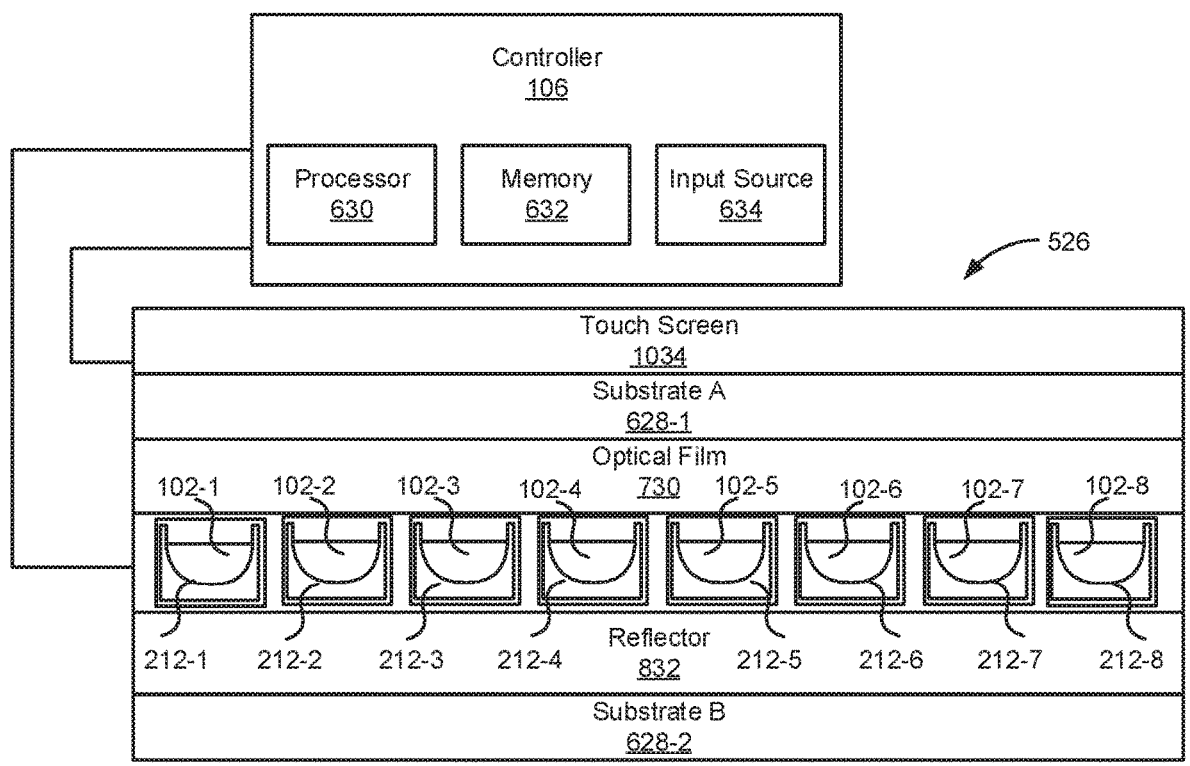
FIG. 12 is an example of a top view of a display for controlling privacy, according to one example of principles described herein.

FIG. 12 is an example of a top view of a display for controlling privacy, according to one example of principles described herein. As will be described below, the display (526) includes substrates (628), an optical film (730), a reflector (832) and a touch sensor (1034).

As illustrated, the display (526) includes substrate A (628-1) and substrate B (628-2). The display (526) includes a reflector (832). The reflector (832) is located between the case (212) and substrate B (628-2) as illustrated in FIG. 9. The optical film (730) is located between substrate A (628-1) and the LED pixels (102). The display (526) includes the touch sensor (1034) located on top of substrate A (628-1) as illustrated.

Figure 13:
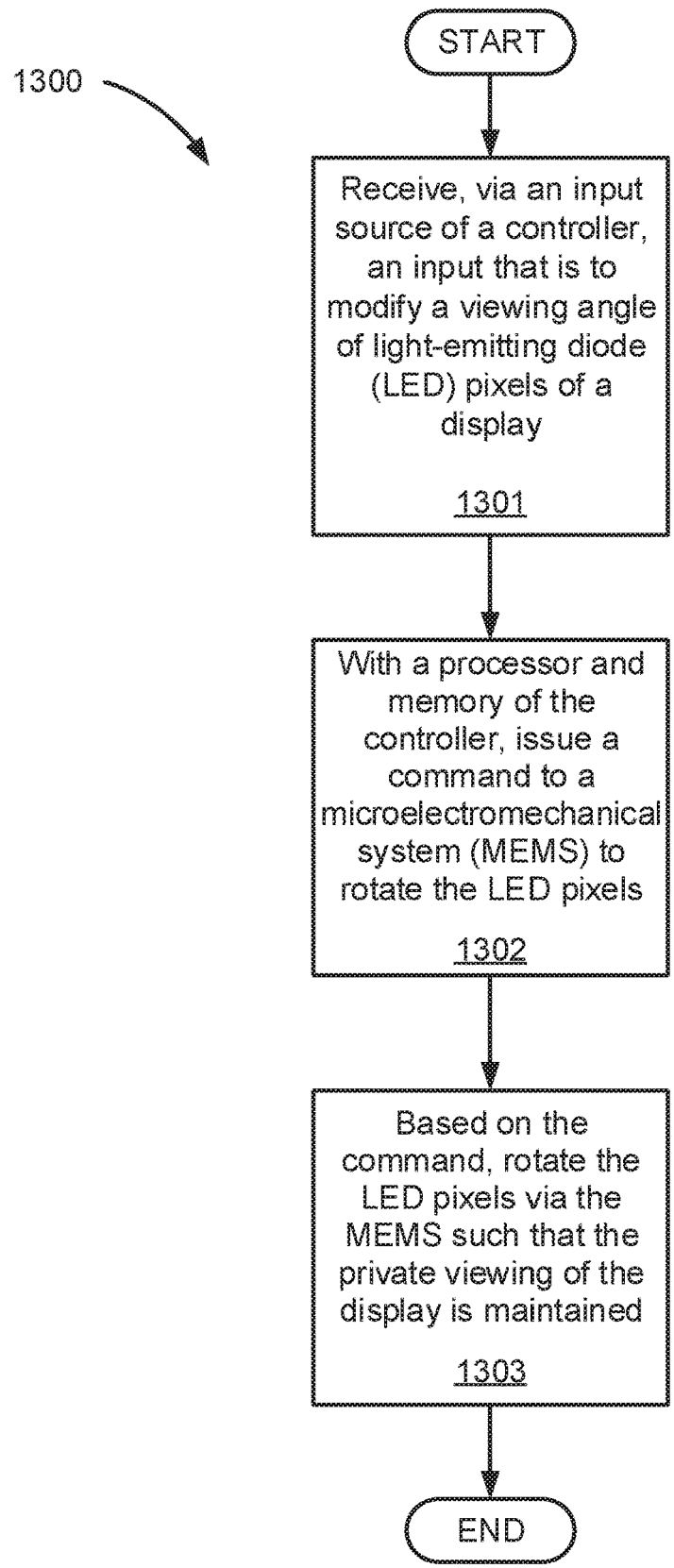
FIG. 13 is a flowchart of a method for controlling privacy on a display, according to one example of principles described herein.

FIG. 13 is a flowchart of a method for controlling privacy on a display, according to one example of principles described herein. The method (1300) is executed by the systems of FIGS. 1A-12. The method (1300) includes receiving (1301), via an input source of a controller, an input that is to modify a viewing angle of LED pixels of a display, with a processor and memory of the controller, issuing (1302) a command to a MEMS to rotate the LED pixels and based on the command, rotating (1303) the LED pixels via the MEMS such that the private viewing of the display is maintained.

As mentioned above, the method (1300) includes receiving (1301), via an input source of a controller, an input that is to modify a viewing angle of LED pixels of the display. In some examples the input source of the controller is a number of push buttons, a rotatable knob or a sensor as described above.

As mentioned above, the method (1300) includes with a processor and memory of the controller, issuing (1302) a command to a MEMS to rotate the LED pixels. In some examples the command specifies an exact angle to rotate the LED pixels. In other example, the command specifies to rotate the LED pixels to a minimum angle, center or a maximum angle such as −70, 0 or +70 degrees.

As mentioned above, the method (1300) includes based on the command, rotating (1303) the LED pixels via the MEMS such that the private viewing of the display is maintained. In some examples, the command rotates the LED pixels to an exact angle or rotates the LED pixels to −70, 0 or +70 degrees such that the privacy on the display for the LED pixels is maintained.

The preceding description has been presented to illustrate and describe examples of the principles described. This description is not intended to be exhaustive or to limit these principles to any precise form disclosed, Many modifications and variations are possible in light of the above teaching.

What is claimed is:

1. A system for controlling privacy on a display, the system comprising:
   a light-emitting diode (LED) pixel rotatably coupled to a microelectromechanical system (MEMS); and
   a controller to control the MEMS, the MEMS to rotate the LED pixel in response to a command issued by the controller to modify a viewing angle of the LED pixel such that the privacy on the display for that LED pixel is maintained.

2. The system of claim 1, wherein the LED pixel comprises a housing to house a blue LED, a green LED, and red LED, and a housing gear located on an inner wall of the housing.

3. The system of claim 2, wherein the MEMS comprises the motor gear connected to a motor such that as the motor rotates in response to the command issued by the controller, teeth of the motor gear enmesh with teeth of the housing gear to rotate the LED pixel.

4. The system of claim 1, wherein the controller comprises a processor and memory to receive an input from an input source of the controller and based on that input issue the command to the MEMS to rotate the LED pixel.

5. The system of claim 4, wherein the input source of the controller comprises push buttons, a rotatable knob, a sensor or combinations thereof.

6. The system of claim 1, wherein the LED pixel is rotated between −70 degrees and +70 degrees via the MEMS in response to the command issued by the controller.

7. A display device, the device comprising: a number of light-emitting diode (LED) pixels; a number of microelectromechanical systems (MEMS), each of the LED pixels rotatably coupled to one of the MEMS; and a controller to individually control each of the MEMS, the MEMS to selectively rotate the LED pixels in response to a command issued by the controller to modify a viewing angle of those LED pixels such that private viewing of the display device is maintained, wherein the MEMS comprises a motor gear connected to a motor such that as the motor rotates in response to the command issued by the controller, teeth of the motor gear enmesh with teeth of the housing gear to rotate the LED pixels, or wherein the LED pixels are rotated between −70 degrees and +70 degrees via the MEMS in response to the command issued by the controller.

8. The device of claim 7, wherein the MEMS rotates each of the LED pixels to an angle in response to the command issued by the controller such that the private viewing of the display for all the LED pixels of the display device is maintained.

9. The device of claim 7, wherein the LED pixels associated with horizontal lines of the display are rotated independent from the LED pixels associated with vertical lines of the display such that the private viewing of the horizontal lines on the display device is maintained.

10. The device of claim 7, wherein the LED pixels associated with vertical lines of the display are rotated independent from the LED pixels associated with horizontal lines of the display such that the private viewing of the vertical lines on the display device is maintained.

11. The device of claim 7, wherein the MEMS rotates a portion of the LED pixels in response to the command issued by the controller such that the private viewing of that portion of the LED pixels of the display device is maintained.

12. The device of claim 7, wherein the controller comprises a processor and memory to receive an input from a rotatable knob of the controller and based on that input issue the command to the MEMS to rotate the LED pixels.

13. The device of claim 7, wherein the controller comprises a sensor to detect a position of a user relative to the display such that the controller issues the command to the MEMS to rotate the LED pixels towards the user.

14. The device of claim 7, wherein the LED pixels comprise a housing to house a blue LED, a green LED, and red LED, and a housing gear located on an inner wall of the housing; and wherein the MEMS comprises the motor gear connected to a motor such that as the motor rotates in response to the command issued by the controller, teeth of the motor gear enmesh with teeth of the housing gear to rotate the LED pixels.

15. A method for controlling privacy on a display, the method comprising: receiving, via an input source of a controller, an input that is to modify a viewing angle of light-emitting diode (LED) pixels of the display; with a processor and memory of the controller, issuing a command to a microelectromechanical system (MEMS) to rotate the LED pixels; and based on the command, rotating the LED pixels via the MEMS such that the private viewing of the display is maintained, wherein the MEMS comprises a motor gear connected to a motor such that as the motor rotates in response to the command issued by the controller, teeth of the motor gear enmesh with teeth of the housing gear to rotate the LED pixels, or wherein the LED pixels are rotated between −70 degrees and +70 degrees via the MEMS in response to the command issued by the controller.

16. The method of claim 15, wherein the LED pixels are rotated between −70 degrees and +70 degrees via the MEMS in response to the command issued by the controller.

17. The method of claim 15, wherein the rotating of the LED pixels includes engaging teeth of the motor gear of the MEMS with teeth of a housing gear located on an inner wall of a housing of an LED pixel to rotate the LED pixel.

* * * * *